(12) United States Patent
Eusch et al.

(10) Patent No.: US 8,091,760 B2
(45) Date of Patent: Jan. 10, 2012

(54) DEVICE FOR FIXING CONDUCTOR TRACKS ON A SOLAR CELL

(75) Inventors: Ingram Eusch, Villach (AT); Rudolf Frank, Pischeldorf (AT); Armin Kogler, Treibach (AT)

(73) Assignee: KIOTO Photovoltaics GmbH, St. Veit (AT)

(*) Notice: Subject to any disclaimer, the term of this patent is extended or adjusted under 35 U.S.C. 154(b) by 0 days.

(21) Appl. No.: 12/956,432

(22) Filed: Nov. 30, 2010

(65) Prior Publication Data

US 2011/0147437 A1 Jun. 23, 2011

(30) Foreign Application Priority Data

Dec. 22, 2009 (EP) ..................... 0915823

(51) Int. Cl.
*B23K 37/00* (2006.01)
(52) U.S. Cl. .............. 228/43; 228/44.7; 228/49.5
(58) Field of Classification Search .......... None
See application file for complete search history.

(56) References Cited

U.S. PATENT DOCUMENTS

| 2006/0091683 A1* | 5/2006 | Hawthorne | 294/82.28 |
| 2008/0061111 A1* | 3/2008 | Kiriyama | 228/47.1 |
| 2009/0056784 A1 | 3/2009 | Reinisch | 136/244 |
| 2009/0211625 A1* | 8/2009 | Schwarze | 136/251 |
| 2009/0236328 A1 | 9/2009 | Dingle et al. | 219/616 |
| 2011/0146748 A1* | 6/2011 | Eusch et al. | 136/244 |

FOREIGN PATENT DOCUMENTS

| DE | 102008020458 | | 11/2009 |
| EP | 1291929 | | 3/2003 |
| EP | 1976024 | | 10/2008 |
| EP | 1978564 | | 10/2008 |
| JP | 62-236638 A | * | 10/1987 |
| JP | 05-245693 A | * | 9/1992 |
| JP | 05-087122 A | * | 4/1993 |
| JP | 2003168811 | | 6/2003 |
| WO | WO 03/059570 | | 7/2003 |
| WO | WO2009/072760 | | 6/2009 |

OTHER PUBLICATIONS

European Search Report from corresponding European Patent App. No. EP 09015823; 3 pages.

* cited by examiner

*Primary Examiner* — Kiley Stoner
(74) *Attorney, Agent, or Firm* — Kusner & Jaffe

(57) ABSTRACT

The invention concerns to a device for fixing conductor tracks on at least one first main-surface of at least one solar cell.

13 Claims, 4 Drawing Sheets

DEVICE FOR FIXING CONDUCTOR TRACKS ON A SOLAR CELL

FIELD OF THE INVENTION

The invention relates to a device for fixing conductor tracks (conductor strips) on at least one first main-surface of at least one solar cell.

BACKGROUND OF THE INVENTION

Usually at least two conductor tracks (conductor paths) extend parallel to each other on a solar cell (photovoltaic-cell), wherein a pair (2) of conductor tracks connect a first main-surface (upper side) of a solar cell with a second main-surface (lower side) of an adjacent solar cell. A series of solar cells connected in this manner form a so called solar cell string, accordingly providing the following features:
 this string comprises a series of solar cells arranged in succession,
 adjacent solar cells are connected by at least two electrical conductor tracks,
 each conductor track is firmly connected with a first section to an upper surface of a solar cell and with a second section to a lower surface of the adjacent solar cell.

Usually the conductor tracks have a base body and a solderable coating. The conductor tracks are soldered onto the solar cells.

To process single solar cells with conductor tracks to a complete solar cell string different processing stages and processing steps are necessary. In this context it is essential to ensure an exact positioning of the individual solar cells and the individual conductor tracks, so that also the combination of a multitude of solar cells with a multitude of conductor tracks to form a solar cell string is achieved in the desired and necessary orientation (arrangement). This is difficult inter alia because the solar cells are extremely thin (approximately 200 μm) and brittle and the conductor tracks with a width of for example 0.5 to 3 mm and a thickness of not more than 0.2 to 1 mm are thin strips, which cannot be brought easily into the desired surface contact (fixation) with the upper surface/lower surface of the solar cell.

"Fixing conductor tracks onto a solar cell" according to the invention means the preparatory (preliminary) step to hold the individual conductor track in a defined position on the solar cell (pure support). Independently thereof the fixing includes alternatively and/or cumulatively the physical/chemical fixation (integral connection) of conductor track and solar cell, for example by soldering.

From DE 10 2006 007 447 A1 an installation is known by which solar cells can be fixed onto a carrier belt. An associated hold-down device consists of a frame with bearing surfaces at both its edge sections that are supported by the conveyer belts in the operating position and have a window in which or next to which hold-down heads are arranged that each have a holding-down pin and are mounted pivotable at the frame.

The pins press onto the conductor tracks when the hold-down device is super imposed on the conductor tracks thereby pressing the conductor tracks onto the solar cell, thus fixing them. In this context it is important that the force by which the conductor tracks are being fixed, only takes effect in one direction. The pins are being supported in so called holding-down heads that are hinged pivotably at the frame.

The known hold-down device is constructionally very complex, the pins cause very small pressure-points, whereby the conductor tracks can easily be damaged. Furthermore, an adjustment of the compressive force with respect to the area of the conductor tracks is impossible and can incidentally only be done individually through the holding-down heads. As a result the known solar cell-string has no sufficient surface connection between conductor track and solar cell.

SUMMARY OF THE INVENTION

The object of invention is to provide a solar cell string with an optimized connection between conductor track and solar cell.

This problem is solved by a device for fixing conductor tracks on at least one first main-surface of at least one solar cell which device includes the following features:
 A transport device, on which a multitude of solar cells at a distance to each other being moveable along a transport direction. The solar cells can both be preassembled individually as well as in any combination to prepare shorter or longer solar cell-strings. The assembly of the conductor tracks and solar cells can take place in the device or in an installation which is arranged upstream to this process steps. With respect to the further process steps, which are carried with the device according to the invention, it is important that
 a series of conductor tracks extend along the main-surface vis-a-vis the transport installation of each solar cell. Usually also conductor tracks are arranged on the second main-surface, especially when smaller or bigger solar cell-strings were preassembled.
 The device further includes at least one crossbar that is moveable from a starting position at a distance to the main-surface into an operating position in which a series of hold-down devices that are protruding from the crossbar towards the main-surface of the solar cell do press along a plane the corresponding conductor tracks. Accordingly, the crossbar has the geometry of an arm or a frame. It can be moved from a starting position into the operating position. It is essential that the crossbar is equipped with said hold-down devices, which are protruding from the crossbar towards the main-surface of the solar cell at least shortly before the hold-down device is touching the conducting tracks, so that the fixation takes place only by the hold-down devices, while the crossbar just serves for mounting the hold-down devices and has the function to move the hold-down devices towards the conductor tracks and back again. That means that a single crossbar can be assembled with a multitude of hold-down devices or all hold-down devices or groups of hold-down devices can be mounted together on a single crossbar. Only the movement of the crossbar is necessary to bring all hold-down devices mounted thereon into contact with the conductor tracks of the solar cells. This can take place with different motion sequences as will be displayed below. It is essential that the hold-down devices are brought into planar contact with the corresponding conductor tracks and insofar
 the hold-down devices are realized by springs that are mounted to the crossbar with one end and being equipped at their other, free end with at least one spherical body resting on the corresponding conductor track in the operating position of the crossbar.

The springs ensure a soft contact between the hold-down device and the conductor track. The springs also make it possible to apply an even pressure by the hold-down devices onto the conductor track. The springs have the further advantages that—within certain limits—the compressive forces the hold-down devices exert onto the conductor tracks vary insignificantly even though there are different distances between crossbar and solar cell. The planar design of the contact ends of the hold-down device homogenises the pressure distribution exerted by the hold-down devices onto the conductor tracks (solar cells). This is achieved by spherical bodies at the free end of the hold-down devices that leave distinctive calotte-like (spherical) indentations in a subsequent soldering process during which the conductor tracks become viscous at least in the surface area. Again during the soldering process when the spherical bodies are pressed into the surface of the conductor track the optimized pressure distribution of the hold-down devices is maintained and significantly improved with respect to the state of the art. "Calotte-like" according to the invention means that an indentation is no unidirectional indentation (in the technical sense), as obtained by a needle according to the state of the art, but describes an indentation in the conductor track that extends over a certain surface area of the conductor track.

For this purpose the holding down devices have for example spherical bodies of the following geometry: sphere, hemisphere, egg, lens, cylinder, truncated cone, cone, prism. The geometrical forms may also be combined to a spherical body. The calotte-like indentation formed during the subsequent soldering process has a ratio of depth (perpendicular to the conductor track surface) to width (largest width parallel to the conductor track-surface) of typically <1:1, for example, <1:2 or <1:3 or <1:5, <1:7 or <1:10. A needle-shaped prick, on the contrary, has a ration of >1:1.

This size of the spherical body depends on the size of the conductor track. A sphere (ball) has a diameter, for example, of 0.5 to 5 mm.

The hold-down devices fix the conductor track on the solar cell both when the conductor track is resting "loosely" against the solar cell as well as during the subsequent soldering process. At the end of the soldering process, when the conductor tracks are connected firmly to the solar cell in a physical/chemical manner the hold-down devices can be removed again by pivoting back the crossbar.

The scope of the invention includes selecting different specific embodiments within this general concept. Including:

The hold-down devices can be made of spiral springs with spherical bodies mounted at their end. Of course it is also possible to design the hold-down devices integrally. Instead of spiral springs also flat springs (leaf springs) may also be used.

The hold-down devices can be mounted at the crossbar in such a way that they extend in an unloaded state (for example in the starting position), at an angle ≠90° with respect to the corresponding surface of the solar cell. In other words: in an embodiment with a spiral spring the central longitudinal axis of the spiral spring does not extend perpendicular to the surface of the solar cell but at an angle of for example 10° to 80°. This inclined position of the hold-down devices results in an optimized pressure distribution and particularly evens out the pressure of a hold-down device onto the conductor track independently of the position of the crossbar relative to the solar cells (within certain limits). With respect to the use of the device within a soldering installation wherein the conductor tracks are soldered onto the solar cells, an embodiment of the invention includes hold-down devices with spherical bodies made of a material which is temperature resistant up to at least 300° C. This includes materials from the group: ceramic, porcelain, glass, plastic, fiber reinforced plastic (e.g. with fiber glass or carbon fibers).

The arrangement of the hold-down devices at the crossbar depends on the positioning of the conductor tracks on the solar cells along the conveyor track. Usually the conductor tracks extend along the solar cells in a straight line and parallel to each other. According to one embodiment of the invention the hold-down devices are mounted to the crossbar in such a way that four spherical bodies are arranged at the corners of a fictitious square in their unloaded state. "Fictitious square" means, that there are no connections between the spherical bodies apart form the indirect connection along the crossbar.

According to the size of the solar cell-string a series of holding down-devices (their spherical bodies) can extend along a fictitious line, wherein they are arranged in such a way that the spherical bodies rest on the corresponding conductor track as centered as possible in the operating position and leave an indentation preferably completely within the conductor track after the soldering process, that means that the indentation should extend only just until the edge of the corresponding surface of the conductor track.

The pushing of the conductor track onto the solar cell can additionally be improved if a hold-down device with a spherical body is used, that has a profiled (textured) surface forming an indentation that has a correspondingly structured (textured) surface, for example a latticed wall section.

In this embodiment various compression forces of different pressure directions are submitted (transmitted) by the hold-down device onto the conductor track and from the conductor track onto the solar cell so that the solder connection during the subsequent soldering process is sustainably improved, in particular a substantially higher surface contact between conductor track and solar cell is achieved, which is important for the electrical conduction.

The geometry of the indentation particularly depends on the geometry of the spherical body that may be, for example, a circular cross section but also an oval cross section or a cross section with evolvent-like edges.

The height of the indentation (perpendicular to the surface of the solar cell) is dependent of the thickness of the conductor track, the compressive force by which the hold-down device is pressed onto the conductor track as well as the geometry of the pressure body. Usually the maximum height of the indentation (perpendicular to the surface of the solar cell and conductor track) corresponds to a maximum of 70% of the overall thickness of the conductor track (viewed in the same direction as the indentation) wherein a value of 10% is sufficient to obtain the desired pressure distribution. Typical values are 10% to 50% or 10% to 30%.

According to one embodiment the distance of the indentations (in longitudinal direction of the corresponding conductor track) is between 1.0 to 3.0 cm, from which a corresponding distance between the hold-down device and the crossbar results.

The cross section of the indentation at the free surface of the conductor track is particularly 0.5 to 5 mm$^2$ with typical values from 0.5 to 2 mm$^2$.

The crossbar can be moved along a curved track from the starting position to the operating position. The movement can be evolvent-like, this means the crossbar is moved more or less horizontally at the beginning while merging along a curve in a perpendicular (vertical) direction just before reaching the operating position. According to the invention it is not necessary, even not just before reaching the operating position, that the crossbar proceeds exactly vertically (perpendicular to the surface of the solar cells) particularly not if the hold-down devices are mounted in a inclined fashion with respect to the crossbar, as explained.

The speed by which the crossbar is moved from the staring position into the operating position can be degressive, that means decreasing towards the end to prevent that the hold-down devices shift the conductor tracks if there is not a 100% alignment of crossbar and solar cells.

The transport installation can include at least one product carrier on which the solar cells (or a solar cell-string) lie. The carriers can have bridge-like ridges on their surface pointing towards the solar cells that are arranged in such a manner that the conductor tracks which run along the second main-surface of the solar cells are supported by the bridge-like ridges and extend parallel to them. This results in an embodiment where the solar cells have planar sections on both sides that are uncovered at least partly. The product carriers are moved by suitable means into the desired position, preferably by a drive. As one product carrier picks up at least one complete solar cell-string a high clock rate is realized and an optimized (steady) transport as well as a steady soldering process in which at least one string is soldered at a time.

Further features of the invention result from the features of the sub claims as well as the other application documents.

BRIEF DESCRIPTION OF THE DRAWINGS

The invention is explained in more detail hereinafter by one embodiment. This shows, each in a schematic illustration.

In the Figures components which are similar or with similar effect are illustrated by the same numerals.

DETAILED DESCRIPTION OF PREFERRED EMBODIMENT

Figure 1:
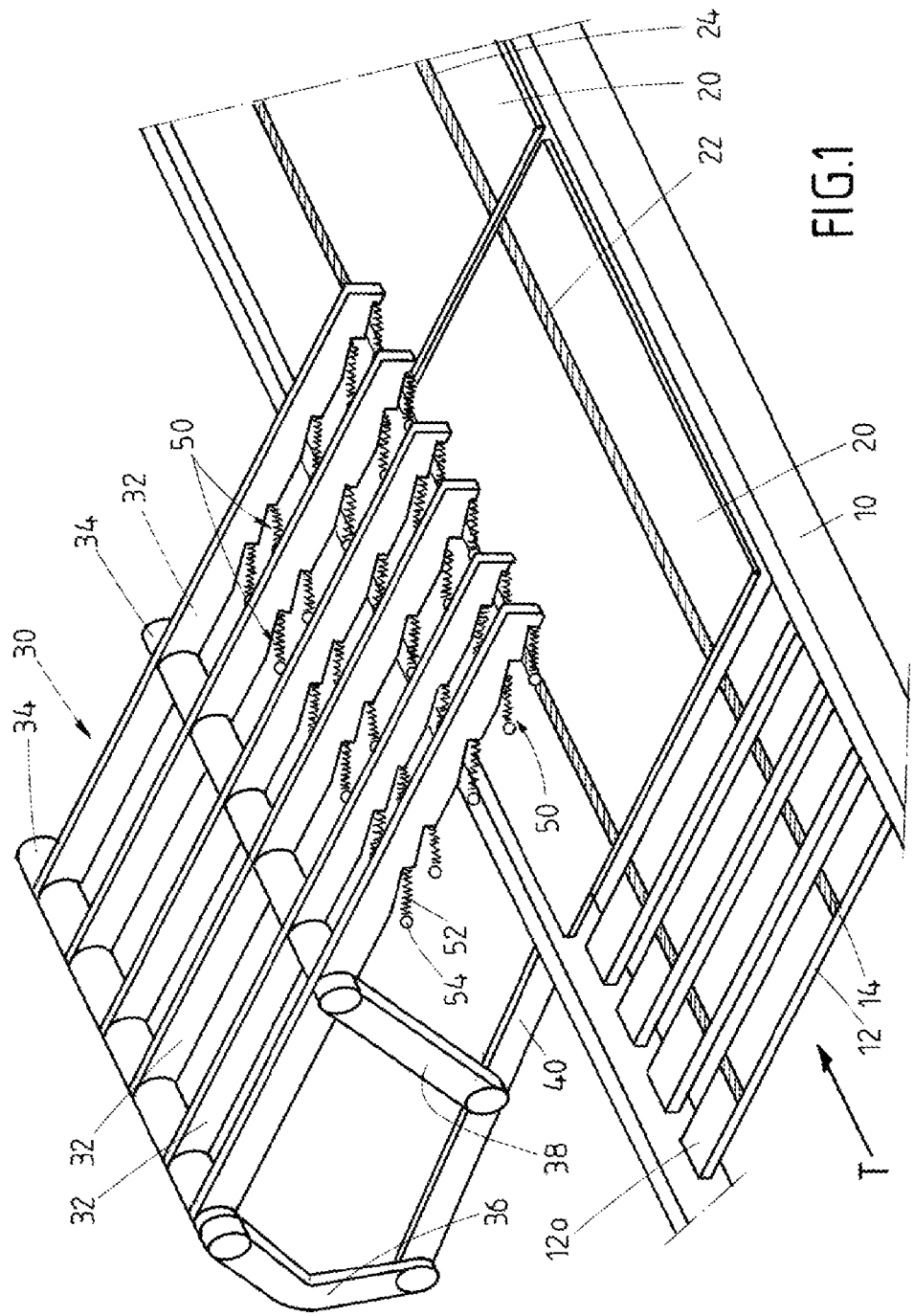
FIG. 1: A perspective view of a device according to the invention.

The device includes a transport system the transport direction of which is characterized by arrow T. The transport system includes transport carriers 10 with tracks 12 that extend perpendicular to the transport direction T. Their upper surface 12o (in the operating position of the device) has bridge-like ridges 14 that extend in transport direction 10, in other words: perpendicular to longitudinal direction of the tracks 12. Several tracks are connected to a transport carrier 10.

On the tracks 12 solar cells 20 are arranged wherein several solar cells 20 are connected to a solar cell-string by corresponding conductor tracks 22, 24. One transport carrier 10 supports at least one complete string.

The transport carriers 10 are moved by driving-means not shown.

The device further comprises a crossbar 30 that has several arms 32 extending parallel at a distance to each other resting pivotably on two cross members 34 that are arranged at a distance to each other wherein the cross members 34 are connecting several arms 32.

From the connecting region (attachment zone) of the arms 32 to the crossbar 34 hinges 36, 38 extend to a rail 40 that extends at a distance below the arms 32, namely along the plane of the transport track 10.

Hold-down devices 50 extend downward from the arms 32 (in the operating position). Each hold-down device 50 is made of a spiral spring 12 which is mounted at a corresponding arm 32 by one end and has a spherical body 54 at its free other end (here: in form of a porcelain ball).

From the Figures it can be deduced that the axial direction of the spring 52 (in its unloaded starting position) as highlighted by the line A-A, extends at an angle of approximately 45° to the horizontal (characterized by line H-H). The angle is labeled in FIG. 2 with α.

Figure 2:
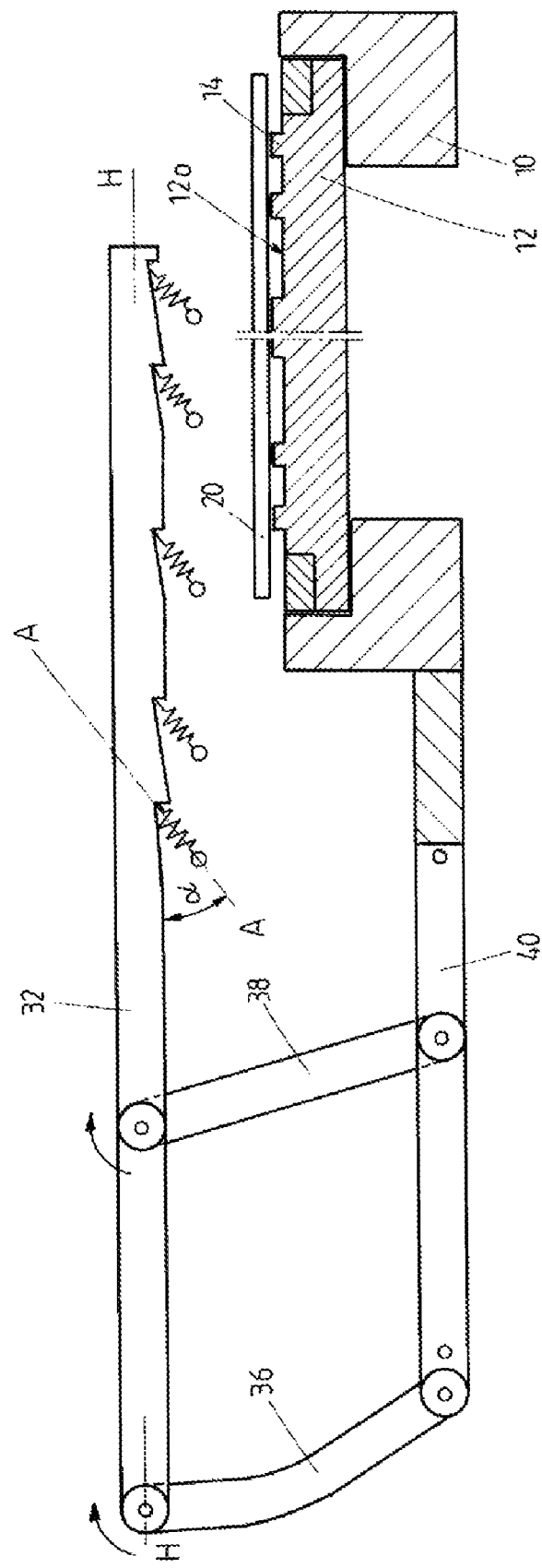
FIG. 2: a side view of the device according to FIG. 1 in the starting position.
Figure 3:
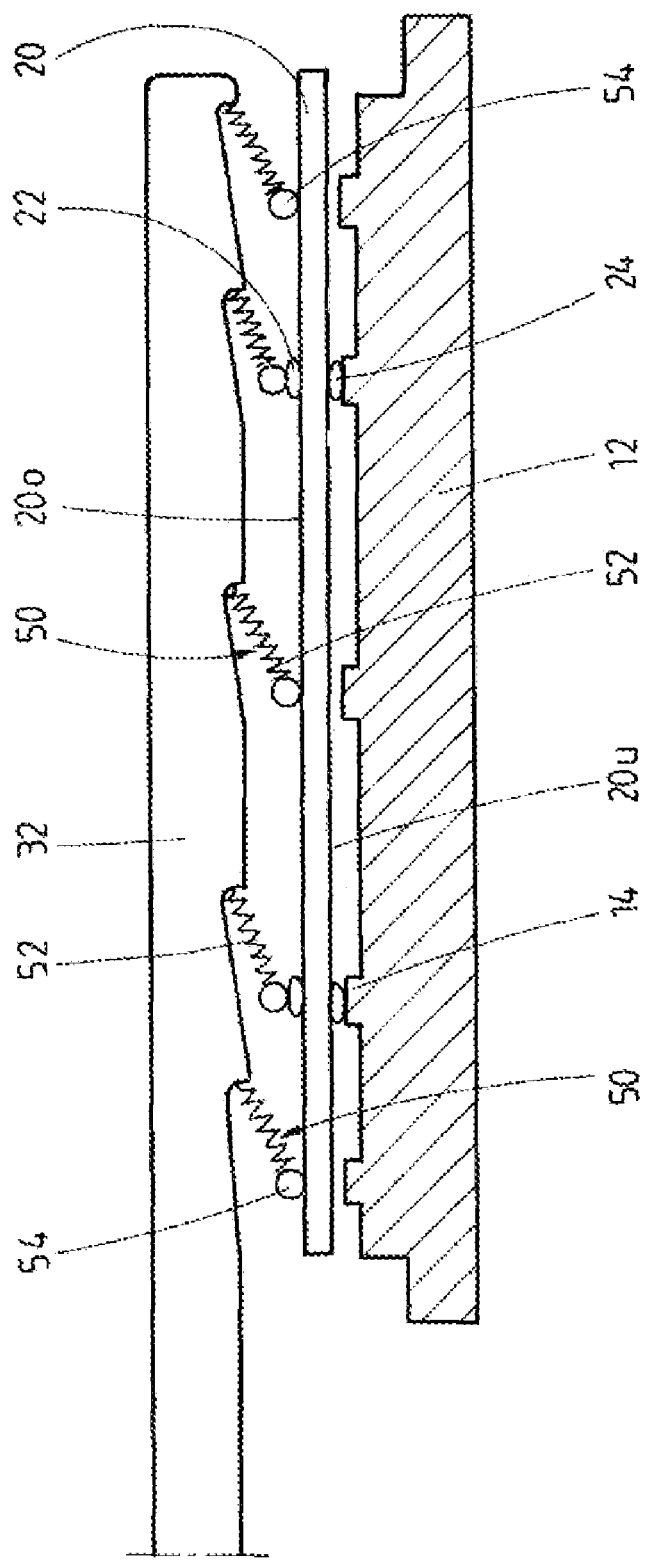
FIG. 3: a partial sectional view through the device according to FIG. 1 in an operating position.

By a drive mechanism (not shown) the crossbar 30 is moved from the starting position shown in FIG. 2 into the operating position shown in FIG. 3, wherein the direction of the movement is curve-like with decreasing speed in order to settle the hold-down devices smoothly onto the conductor tracks 22, 24 as soon as the crossbar 30 has reached the respective position above the transport carrier 10. After the first contact between the spherical bodies 54 and the conductor tracks 22, 24 the crossbar 30 is lowered a little further to achieve a certain compressive force of the hold-down devices 50 onto the conductor tracks 22, 24 and accordingly from the conductor tracks 22, 24 onto the solar cells 20.

The position (the angle α) of the hold-down devices changes; it decreases a little bit as shown in FIG. 3.

FIG. 3 also shows that some hold-down devices 50 do not rest on the conductor tracks 22, 24 but directly on the first main-surface 20o of the respective solar cell 20.

In the alignment shown in FIG. 3 the soldering process takes place subsequently. This process is known "per se" and is therefore not explained or displayed any further.

Figure 4:
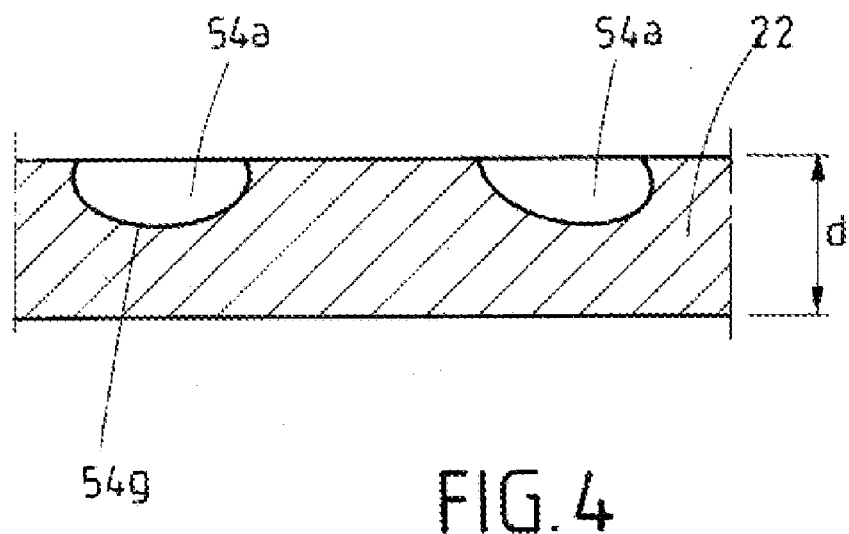
FIG. 4: a cross-section through a conductor track.
Figure 5:
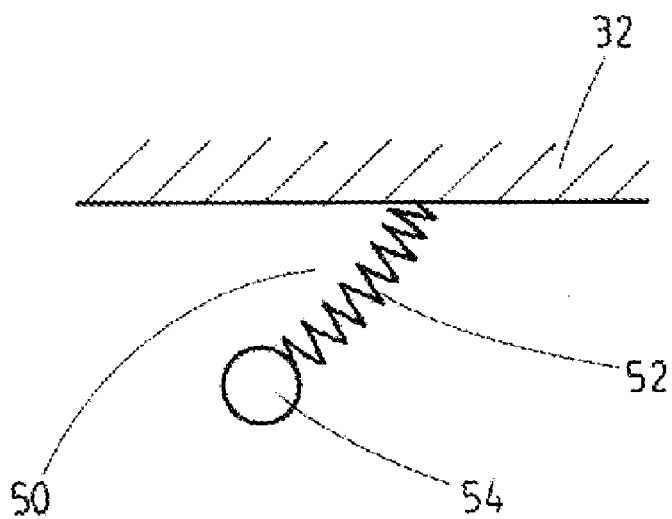
FIG. 5: a side view of a hold-down device attached to a crossbar.

During the soldering a softening (decreased viscosity) of the material of the conductor tracks 22, 24 occurs to a certain extent with the result that the spherical bodies 54 are pressed into the material of the conductor tracks 22, 24 under the pressure of the springs 52 leaving indentations 54a as shown in FIG. 4. The calotte-like indentations 54a are clearly visible. They extend centered in the corresponding conductor tracks 22, 24.

In a top view the calotte-like indentations 54a have an approximately oval cross section.

The curved edges 54g of the indentations 54a can be seen wherein the maximum height of the indentations 54a is in this case approximately half of the thickness d of the conductor track 22, 24. The indentation 54a shown in FIG. 4 on the right is slightly tilted compared to the indentation 54a displayed on the left to demonstrate that the indentations 54a can't always have an exactly symmetrical geometry under the prevailing technical circumstances and can't always extend from an exactly centered position on the conductor track but also slightly eccentrical.

Nevertheless it is desired that the indentations 54a extend preferably completely within the corresponding conductor track 22, 24 that means being limited circumferentially by the free surface of the according conductor track 22, 24.

Together with the curved edges 54g this results in an optimized force-/pressure distribution by the corresponding hold-down device during the fixing process and during the subsequent soldering process.

The optimized pressure distribution of the hold-down devices on the solar cell-string or its parts (solar cells, conductor tracks) respectively further prevents that the solar cells bend up/deform under the influence of temperature (especially during the soldering process). A linearly soldered string results. By the pressure distribution achieved according to the invention it is prevented that the solar cells are breaking, as can be seen in the state of the art.

Having described the invention, the following is claimed:

1. Device for fixing conductor tracks (22, 24) on at least one first main-surface (20o) of at least one solar cell (20), including the following features:

1.1 a transport installation on which a series of solar cells (20) are arranged at a distance to each other and moveable in a transport direction (T), 1.2 a series of conductor tracks (22, 24) extend along the first main-surface (20*o*) opposing the transport installation of each solar cell (20), 1.3 at least one crossbar (30) moveable from a starting position with a distance to the first main-surface (20*o*) to an operating position in which a series of hold-down devices (50) that are protruding from the crossbar (30) towards the first main-surface (20*o*) of the solar cell (20) press along a plane onto the corresponding conductor tracks (22, 24) wherein 1.4 the hold-down devices (50) are springs (52), one end of each being mounted to the crossbar (30) and each being provided at its other, free end, with at least one spherical body (54) that is resting on the corresponding conductor track (22, 24) in the operating position of the crossbar (30) wherein 1.5 said hold-down devices (50), in their unloaded condition, extend at an angle not equal to 90 degrees to the corresponding surface (20*o*) of the solar cell (20).

2. Device according to claim 1 which hold-down devices (50) are spiral springs comprising a spherical body (54) attached at their end.

3. Device according to claim 1 which hold-down devices (50), in their unloaded condition, extend at an angle between 10 and 80 degrees to the corresponding surface (20*o*) of the solar cell (20).

4. Device according to claim 1 wherein the spherical bodies (54) of the hold-down devices (50) are made of a material that is temperature resistant up to at least 300° C.

5. Device according to claim 1, wherein the spherical bodies (54) of the hold-down devices (50) are made of at least one material from the group: ceramic, porcelain, glass, plastic.

6. Device according to claim 1, wherein the spherical bodies (54) have at least one of the following geometrical shapes: sphere, hemisphere, egg, lens, cylinder, truncated cone, cone, prism.

7. Device according to claim 1, wherein the hold-down devices (50) are mounted at the crossbar (30) in such a way that in unloaded condition four spherical bodies (54) are arranged at corners of a fictitious square.

8. Device according to claim 1, wherein the crossbar (30) can be moved along a curved track from the starting position into the operating position.

9. Device according to claim 1, wherein a speed, by which the crossbar is moved from the starting position into the operating position, is degressive.

10. Device according to claim 1, which transport installation has at least one transport carrier (10) for supporting the solar cells (20).

11. Device according to claim 10, which transport carrier (10) has tracks (12) with ridges (14) on their surface (12*o*) pointing towards the solar cells (20) that are arranged in such a manner that the conductor tracks (22, 24) which run along the second main-surfaces (20*u*) of the solar cells (20) are supported by the bridge-like ridges (14) and extend parallel to them.

12. Device according to claim 1 which crossbar (30) is moveable in a direction which extends along at least one other direction of the coordinate system perpendicular to the transport direction (T) of the transport installation.

13. Device according to claim 1, wherein the spherical bodies (54) are made of a fiber reinforced plastic.

* * * * *